Oct. 20, 1942.  E. R. BARRETT  2,299,372
CABLE CONTROLLED DUMP BODY FOR SEMITRAILERS
Filed Jan. 9, 1941  2 Sheets-Sheet 2
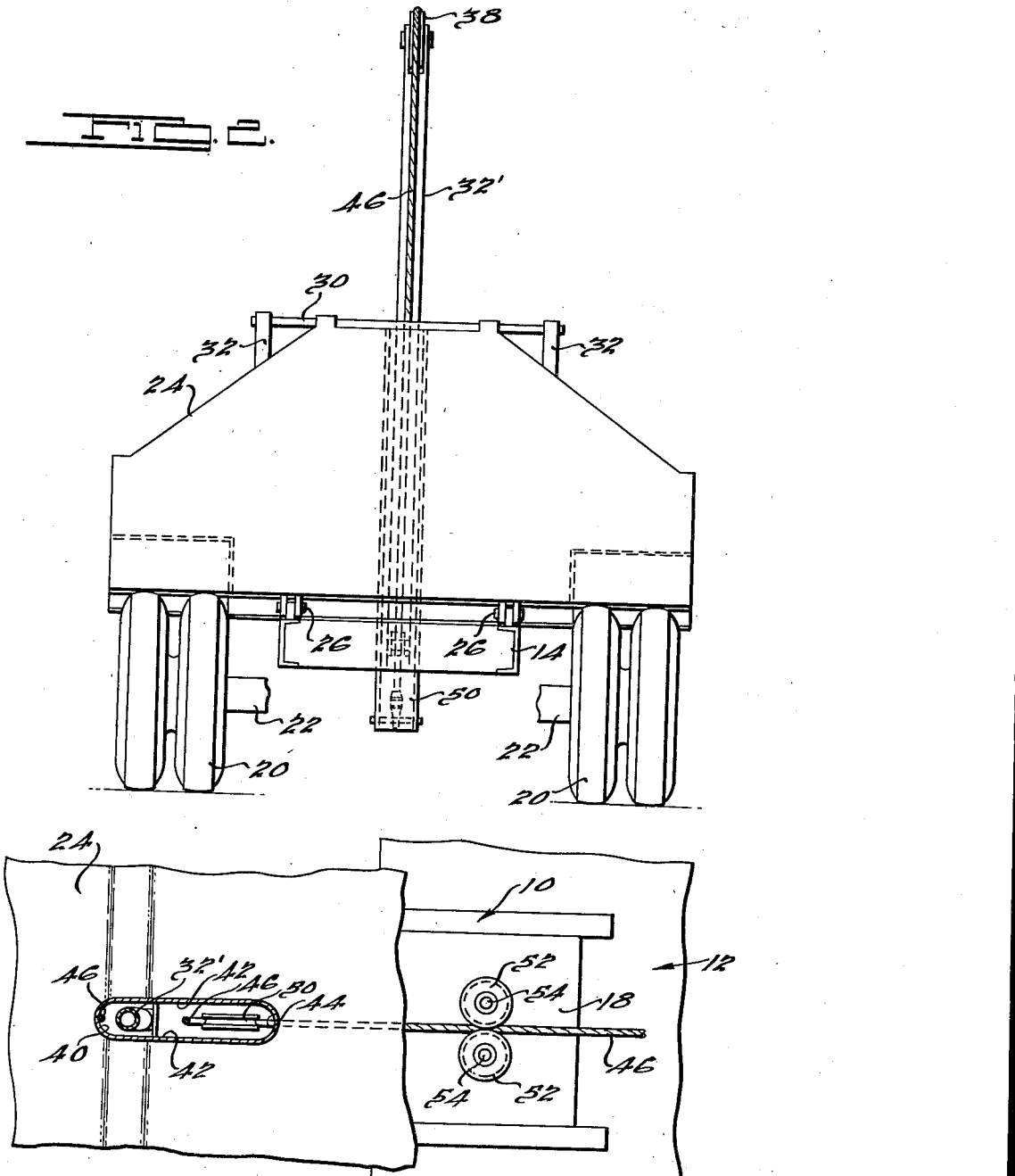
INVENTOR
Edward R. Barrett.
BY
Harness, Dickey & Pierce.
ATTORNEYS.

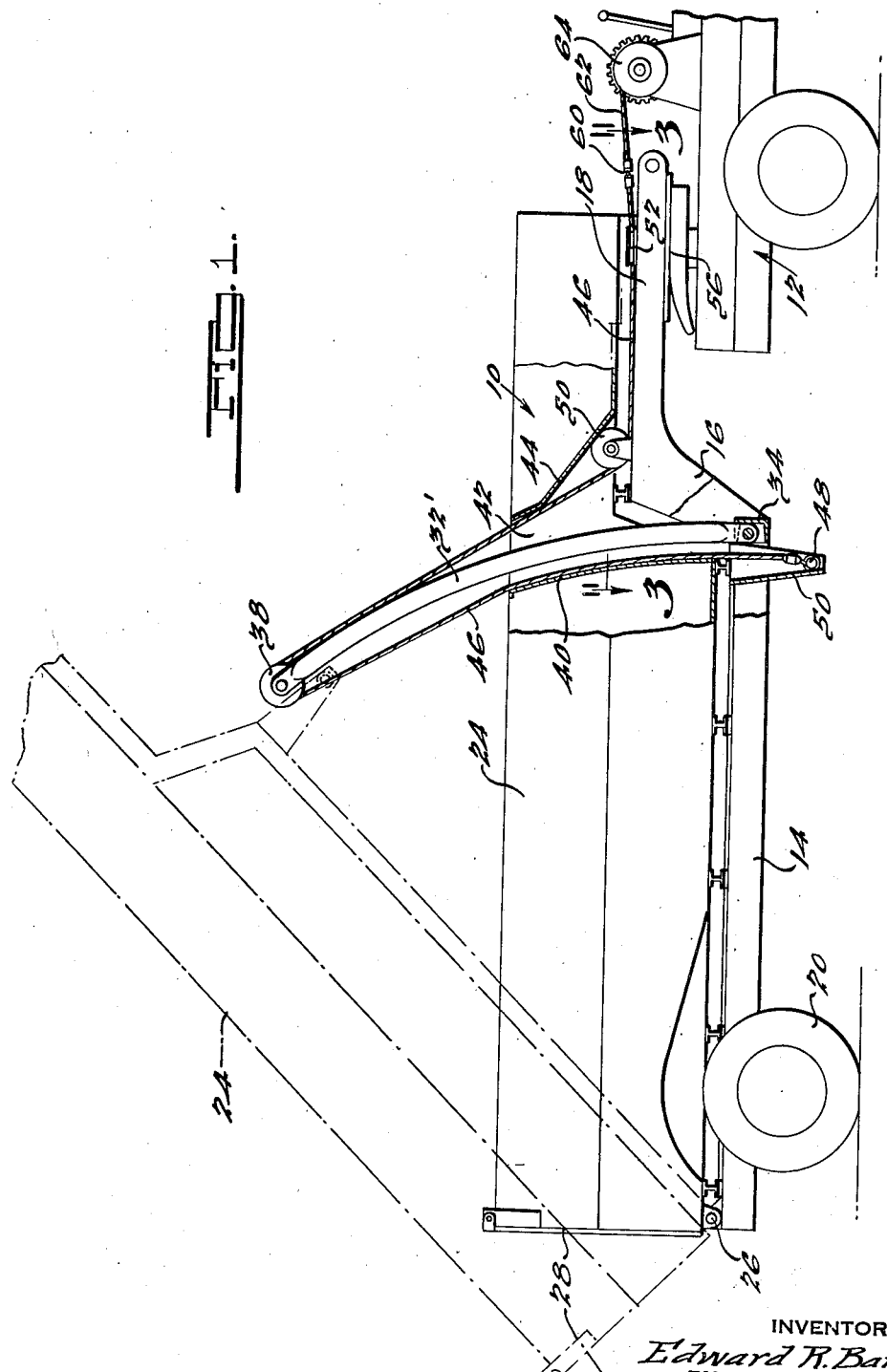

Patented Oct. 20, 1942

2,299,372

UNITED STATES PATENT OFFICE 2,299,372

CABLE CONTROLLED DUMP BODY FOR SEMITRAILERS

Edward R. Barrett, Detroit, Mich., assignor to Gar Wood Industries, Inc.

Application January 9, 1941, Serial No. 373,762

3 Claims. (Cl. 298—19)

The present invention relates to dump bodies for semi-trailers and particularly relates to cable controlled or actuated dump bodies for semi-trailers.

One of the primary objects of the present invention is to provide a cable operated hoist for a dump body which is of a simple, sturdy, and economical construction.

Another object of the present invention is to provide a cable operated hoist for a semi-trailer in which the cable may be operated regardless of the position of the tractor with respect to the trailer.

Another object of the invention is to provide a cable hoist construction for a dump body in which the cable is protected from interference with the load in the trailer body.

A further object of the invention is to provide a cable operated hoist for a relatively long dump body which will raise the body to a relatively high angle for dumping.

Other objects of the invention will become apparent from the following specification, the drawings relating thereto, and from the claims hereinafter set forth.

In the drawings, in which like numerals are used to designate like parts in the several views throughout:

Fig. 1 is a fragmentary, side elevational view of a semi-trailer and tractor with portions of the semi-trailer body removed illustrating parts in cross section;

Fig. 2 is a rear elevational view of the construction shown in Fig. 1; and

Fig. 3 is a cross sectional view taken substantially along the line 3—3 of Fig. 1.

Referring to the drawings, a drop frame type of semi-trailer is generally indicated at 10 and is pivotally and detachably connected to an automotive tractor, the rear end of which is generally indicated at 12. The semi-trailer includes a drop frame chassis having a generally horizontal rear portion 14, an upwardly and forwardly extending central portion 16 and a generally horizontal, forwardly extending portion 18, which are formed to provide an integral frame. The frame includes the usual transversely extending bracing members, and ground engaging wheels 20 are mounted upon a transversely extending axle 22 which is connected to the chassis frame adjacent the rear thereof in the usual way.

A tiltable dump body 24 having bottom, front and side walls is pivotally mounted upon the chassis by means of pivots 26 located adjacent the rear end of the body and chassis. Such pivots 26 pivotally connect co-operating hinges secured to the body and frame, respectively. The body is so formed that the forward portion thereof overlies the forwardly projecting portion 18 of the chassis.

A rear tail gate 28 is pivotally connected to the body 24 adjacent the rear end thereof by means of a transversely extending pivot rod 30 which is mounted in depending brackets 32. Such brackets 32 may be fixed to the top sides of the dump body.

The hoisting means for tilting the body to the position shown in broken lines in Fig. 1, includes an upwardly extending and rearwardly curved strut 32' which is fixedly secured to a transversely extending frame member 34. Such member 34 is secured to and integral with the chassis frame so that the strut 32' is fixed with respect to such frame. The strut 32' is preferably curved on an arc which is substantially that of an arc struck with the pivot point 26 as its center.

A guide pulley 38 is pivotally secured to the upper end of the strut 32'. The strut 32' extends upwardly through the body 24 and projects upwardly therebeyond to a predetermined height in order to get the desired angle of tilt. In order to protect the strut 32' and the hoisting cable from interference by the load in the dump body, the strut projects through a protecting well which is defined by a rear confining wall 40, side confining walls 42 and a front confining wall 44. Such confining walls and the strut 32' are disposed at substantially the transverse center of the body and are also disposed adjacent the sloping portion 16 of the chassis frame.

A hoisting cable 46 has the lower rear end thereof connected to a pin 48 which is secured to the lower end of a depending bracket or housing 50, which is secured to the underside of the dump body for tilting movement therewith. The cable is passed upwardly through the protecting well formed in the body and may engage the forward confining wall 40. The cable is trained over pulley 38 and is then trained downwardly through the well and around another guide pulley 50, which is mounted upon brackets secured to portion 18 of the drop chassis adjacent the outlet of the protecting well.

The cable is then passed forwardly between a pair of guide pulleys 52 which are pivotally mounted upon upstanding pivot pins 54 secured to the chassis portion 18. Such pulleys are closely positioned together so that the cable 46 is guided therebetween, as best shown in Fig. 3.

The semi-trailer is releasable and pivotally connected to the tractor through a conventional fifth wheel mechanism generally indicated at 56. Such fifth wheel mechanism includes a depending king pin fixedly mounted to the chassis 18, which is adapted to releasably be received within a cooperating member mounted on the tractor 12. The connection is such that the tractor may be turned with respect to the semi-trailer since the relatively angular positions of the tractor and semi-trailer constantly vary in the ordinary course of operation. The guide pulleys 52 are so positioned that the point at which they engage and guide the cable 46 is above and substantially aligned with the pivot point of the semi-trailer with the tractor. In other words, such point is substantially vertically above the king pin which is secured to the drop frame chassis.

Releasable connecting means 60 are provided at the free end of the cable so that such end may be connected to a pull cable 62 which is operatively connected with the drum of a power winch 64. As will be seen in Fig. 1, the releasable connecting means are of larger diameter than the cable. Since the pulleys 52 are close together, as shown in Fig. 3, the larger diameter connecting means 60 cannot pass therebetween. Thus, when the trailer is released from the tractor, the cable 46 will not become displaced and will be in position for ready connection when the tractor and trailer are re-connected. Such winch 64 may be of conventional construction and may be suitably driven in the usual way from the power take-off of the tractor, or otherwise. It will thus be appreciated that with the cable 46 connected to the pull cable 62 and with the winch operating, the body is dumped from the position shown in full lines in Fig. 1 to that shown in broken lines. It will also be appreciated that with the guide pulleys 52 in the position shown, the semi-trailer and tractor may assume any angular position with respect to each other without interfering with the operation of the hoisting cable. Furthermore, the cable is amply protected by the housing 50 and by the protecting well.

Formal changes may be made in the specific embodiment of the invention described without departing from the spirit and substance of the invention, the scope of which is commensurate with the appended claims.

What is claimed is:

1. A tractor having a winch mounted thereon, a semi-trailer dump vehicle adapted to be releasably and pivotally connected to said tractor comprising a chassis frame, a dump body, means pivotally mounting said body on said frame, an upstanding strut mounted on said chassis and extending above said body, a cable guide mounted on the upper end of said strut, a hoisting cable having one end connected to said body, said cable being trained about said guide, cable guide means through which said cable passes disposed on said chassis substantially vertically aligned with the pivot axis of said semi-trailer with respect to said tractor, whereby said tractor may assume any angular position with respect to said semi-trailer without interfering with the dumping operation of the cable, and a releasable coupling interposed in said cable between said cable guide means and said winch, and means to prevent said cable from completely passing through said cable guide means when the releasable coupling is uncoupled.

2. A tractor having a winch mounted thereon, a semi-trailer dump vehicle adapted to be releasably and pivotally connected to said tractor comprising a drop frame chassis, a dump body, means pivotally mounting said body on said frame, an upstanding strut mounted on said chassis and extending upwardly through said body, protecting means around said strut and on said body, a cable guide mounted in the upper end of said strut, a hoisting cable having one end connected to the under side of said body, said cable extending upwardly through said protecting means, around said guide and downwardly through said protecting means, cable guide means through which said cable passes disposed on said chassis substantially aligned with the pivot point of said semi-trailer with said tractor, whereby said tractor may assume any angular position with respect to said semi-trailer without interfering with the dumping operation of the cable, and a releasable coupling interposed in said cable between said cable guide means and said winch.

3. A tractor having a winch mounted thereon, a semi-trailer dump vehicle adapted to be releasably and pivotally connected to said tractor comprising a chassis frame, a dump body, means pivotally mounting said body on said frame for tilting movement about the rear end thereof, an upwardly and rearwardly curved strut mounted on said chassis and extending upwardly through and above said body, a cable guide mounted on the upper end of said strut, a hoisting cable having one end connected to said body adjacent said strut, said cable being trained about said guide, a pair of guide pulleys between which said cable passes disposed on said chassis above and substantially aligned with the pivot point of said semi-trailer with said tractor, whereby said tractor may assume any angular position with respect to said semi-trailer without interfering with the dumping operation of the cable, and a releasable coupling interposed in said cable between said pair of guide pulleys and said winch.

EDWARD R. BARRETT.